United States Patent Office 3,359,309
Patented Dec. 19, 1967

3,359,309
CATALYTIC PROCESS FOR PREPARING UNSATURATED ALIPHATIC ALDEHYDES AND MONOCARBOXYLIC ACIDS FROM OLEFINS
Howard S. Young and Edgar L. McDaniel, Kingsport, Tenn., assignors to Eastman Kodak Company, Rochester, N.Y., a corporation of New Jersey
No Drawing. Filed June 15, 1964, Ser. No. 375,284
16 Claims. (Cl. 260—533)

This invention relates to a process for preparing unsaturated aliphatic aldehydes and monocarboxylic acids and to novel catalyst compositions useful in the process of the invention. More particularly it relates to a vapor phase process for the production of acrolein, methacrolein, acrylic acid and methacrylic acid by oxidizing propylene or isobutylene with oxygen in the presence of our novel catalyst comprising a mixture of an oxide of arsenic and a heteropoly acid of molybdenum containing manganese as the central atom on a carrier.

Unsaturated aliphatic aldehyde and acids have utility in a wide variety of commercial applications. While a number of catalytic processes involving air oxidation of propylene or isobutylene, in the presence of certain metallic oxide catalysts, have been proposed for the preparation of acrolein and methacrolein, respectively, most of these processes have not proven entirely satisfactory for commercial applications primarily because of the difficulty of maintaining the catalysts in a selectively active condition over long periods of reaction time. This requirement of long-life catalysts is recognized as being particularly necessary for continuous manner of operations.

We have now found that by passing a mixture of propylene and oxygen, in certain proportions, at elevated temperatures and in the vapor phase, over a catalyst comprising a mixture of an oxide of arsenic and a heteropoly acid of molybdenum containing manganese as the central atom, or salts of said heteropoly acids, on a carrier, the reaction goes smoothly and results in relatively high conversions to acrolein and organic acids comprising acrylic acid as the major acid component. Acetic acid is also produced. When isobutylene is employed instead of propylene the reaction also goes smoothly and methacrolein, methacrylic acid and acetic acid are obtained along with traces of acrolein and acrylic acid. The reaction products can be readily recovered from the effluent stream from the reactor by conventional separation means, e.g. by fractional distillation of the effluent condensate.

The novel catalyst compositions used in carrying out the process of the invention retain their activity and selectivity over relatively long-life periods without appreciable physical deterioration, thereby providing an efficacious vapor phase catalytic process for the production of acrolein and acrylic acid from propylene and oxygen, and of methacrolein and methacrylic acid from isobutylene and oxygen. The novel catalyst compositions are especially well adapted for continuous modes of operation as, for example, in a fluidized bed type of reactor.

It is, accordingly, an object of the invention to provide a novel and improved process for the preparation of unsaturated aliphatic aldehydes and monocarboxylic acids from propylene and oxygen or isobutylene and oxygen.

Another object is to provide a novel vapor phase process for converting a mixture of propylene and oxygen to acrolein. Another object is to carry out the conversion to acrolein in a continuous process.

Still another object is to provide a novel vapor phase process for converting a mixture of propylene and oxygen to acrylic acid. Another object is to carry out the conversion to acrylic acid in a continuous manner.

Another object of the invention is to provide a novel process for the preparation of methacrolein.

A further object of the invention is to provide a novel process for the preparation of methacrylic acid.

Another object is to provide novel catalysts.

In accordance with the invention, we prepare unsaturated aliphatic aldehydes and monocarboxylic acids by passing a feed mixture comprising propylene or isobutylene and molecular oxygen, in vapor phase at elevated temperatures, over a catalyst comprising a mixture of (1) a heteropoly acid of molybdenum containing manganese as the central atom and (2) an oxide of arsenic on a carrier. Process-wise the present invention is particularly concerned with the process for converting propylene to acrolein and acrylic acid.

As shown hereinafter, the mole ratios of the olefin and oxygen reactants can be varied over a relatively wide range. To minimize the possibility of an explosion water vapor can be included in the feed mixture. It may be added in amounts up to 5 moles of water per mole of the olefin (propylene or isobutylene). Inert gaseous diluents other than water vapor, such as nitrogen, carbon dioxide, argon, helium, neon, or the like, can be included in the feed mixture to minimize the possibility of an explosion. The mole ratio of the olefin to oxygen can range from 1:0.2 to 1:10, preferably from 1:0.3 to 1:8. Contact times of from 0.05 to 30 seconds can be used, but contact times of from 0.5 to 10 seconds are preferred. The oxygen can be fed as air or as a mixture with the inert gaseous diluents just named. The temperature of the reaction can be varied from about 300° C. to about 600° C., but preferably ranges from 350° C.–550° C. The reaction is not significantly pressure dependent. Pressures of slightly under 1 atmosphere to about 5 atmospheres are preferred, although other pressures can be used. The gaseous hourly space velocity may be varied over a wide range, for example, values from about 100–6000, but preferably from 200–1000. The reaction can be carried out in fixed or fluidized catalyst beds. However, since the reaction is highly exothermic, it is of some advantage to use a fluidized catalyst bed wherein the catalyst exists as small particles which are suspended in an upflowing stream of feed gas. If desired, the acrolein may be recycled through the system to increase the yield of acrylic acid.

In preparing the novel catalyst compositions employed by us in carrying out the process of the invention, an essentially intimate mixture of a heteropoly acid of molybdenum containing manganese as the central atom, such as, for example, mangani-9-molybdic acid having the empirical formula: $H_6MnMo_9O_{32}$, a carrier and an oxide of arsenic such as arsenic trioxide ($As_2O_3$) or arsenic pentoxide ($As_2O_5$) or mixtures thereof, is prepared and calcined. The calcination can be carried out, for example, by heating the catalyst mixture at a temperature of from about 200° C. to about 600° C. for a period of several hours or more. The calcined mixture is then reduced to operable granules or particles. Preferably the calcining operation is carried out in the presence of air or other suitable oxygen-containing gaseous mixture. However, it can be conducted in the absence of oxygen.

The heteropoly acid or its ammonium salt can be used in the preparation of the catalyst. Presumably, the ammonium salt of the acid decomposes wholly, or in part, to ammonia and the acid under calcination or during use at reaction temperatures. The concentration of the heteropoly acid can vary from about 5 to about 50% (preferably 30–50%) by weight of the catalyst. The concentration of the oxide of arsenic, calculated as $As_2O_5$, can range from about 1 to about 20% (preferably 2 to 9%) by weight of the catalyst. The heteropoly acid is always present in a greater percent by weight than the oxide of arsenic. The carrier can comprise about 30 to about 94% by weight of the total catalyst composition. The most outstanding results in accordance with the invention are obtained with catalysts comprising 40 to 70% by weight of carrier. The heteropoly acid and the oxide of arsenic are supported on a carrier because it is advantageous to support them on a carrier. The percentages just given are for calcined carrier-supported catalysts. Thus, the weight of the catalyst includes the weight of the carrier.

Carriers that can be employed include, for example, silica, silica-alumina, kieselguhr, pumice, titania, zirconia, clay, etc. The use of silica as a carrier is preferred. The term silica includes silica gel, for example. The catalyst compositions can be readily regenerated by treatment with air or a gas containing molecular oxygen at or above the reaction temperatures. The novel calcined catalyst compositions of the invention possess good physical strength. Physical strength is important in any solid catalyst, and especially in the case of those to be used in a fluidized state where the catalyst must be strong enough to resist attrition.

In practicing the invention, any of the conventional types of apparatus suitable for carrying out the process of the invention in the vapor phase can be employed including, for example, a tubular type of fluidized or fixed bed reactor or furnace which is equipped to contain the catalyst in intimate contact with the entering feed gases. The effluent gases are then conducted to suitable condensing and separatory equipment for recovering the aliphatic aldehyde and carboxylic acid products. Advantageously, the reaction is periodically interrupted to regenerate the catalyst by feeding into the reactor a stream of air or gases containing molecular oxygen and noncombustibles at or above reaction temperature.

The definitions of certain terms used herein are as follows:

Contact time is the average time in seconds which the reactants spend at reaction conditions in a volume equal to that of the catalyst bed.

The percent conversion of propylene to acrolein =

$$\frac{\text{moles of acrolein formed}}{\text{moles of propylene fed}} \times 100$$

The percent yield of acrolein =

$$\frac{\text{moles of acrolein formed}}{\text{moles of propylene consumed}} \times 100$$

The percent conversion of propylene to organic acid =

$$\frac{\text{moles of organic acids formed}}{\text{moles of propylene fed}} \times 100$$

Gaseous hourly space velocity (GHSV) is defined as the number of volumes of feed gases at standard temperature and pressure (STP) which pass through one volume of catalyst bed in one hour.

The following examples illustrate the invention.

*Example 1*

A catalyst consisting of by weight 5% arsenic pentoxide, 40% mangani-9-molybdic acid and 55% silica was prepared as follows. A solution of 5 g. of arsenic pentoxide in 25 ml. of water was added to 183 g. of a 30% silica sol and then 46.9 g. of pulverized ammonium mangani-9-molybdate octahydrate, prepared according to Waugh et al., Acta Cryst., 7, 438 (1954), was added with stirring. The slurry which resulted was (1) heated and stirred until it thickened, (2) dried on a steam bath and then (3) dried overnight in an oven at 125° C. The preparation resulting was calcined in a muffle furnace for 3 hours at 250° C. and then for 1 hour at 450° C. The calcined catalyst obtained was tested as described hereinafter.

*Example 2*

Ten ml. of 28 x 60 mesh of the catalyst prepared in Example 1 were charged to a fixed bed microcatalytic reactor system. The reactor system was connected to a gas chromatograph with appropriate gas sampling valves. The arrangement employed permitted continuous operation of the reactor with sampling of the effluent from the reactor and quantitative analysis of the product stream as desired. Four runs were made using varying conditions. In Runs 1 and 2 a feed stream consisting of 12 ml. of propylene and 92 ml. of air per minute, STP, was charged to the reactor. In Run 3 a feed stream consisting of 9 ml. of propylene, 67 ml. of air and 27 ml. of water vapor per minute, STP, was charged to the reactor. In Run 4 a feed stream consisting of 9 ml. of propylene, 65 ml. of air and 27 ml. of water vapor per minute, STP, was charged to the reactor. The results obtained are set forth in Table I along with other operating data.

TABLE I

| Run No. | Temp., °C. | Contact Time, Sec. | $C_3H_6:O_2:H_2O:N_2$, Mole Ratios | Acrolein Conv., Percent | Acrolein Yield, Percent |
|---|---|---|---|---|---|
| 1 | 425 | 2.2 | 1:1.5:0:6 | 5.3 | 14.4 |
| 2 | 455 | 2.2 | 1:1.5:0:6 | 10.4 | 61.0 |
| 3 | 455 | 2.2 | 1:1.5:3:6 | 10.6 | 74.7 |
| 4 | 515 | 2.2 | 1:1.5:3:6 | 18.4 | 51.9 |

Small amounts of acrylic acid were obtained in these runs.

The calcining operation described in Example 1 was carried out in the presence of air.

The novel catalyst of our invention has been illustrated hereinbefore with reference to a specific catalyst composition. However, it is to be clearly understood that other catalyst compositions of our invention can be readily prepared within the limits noted hereinbefore. Thus calcined catalytic compositions containing by weight (a) 30% mangani-9-molybdic acid, 20% arsenic pentoxide and 50% silica; (b) 35% mangani-9-molybdic acid, 9% arsenic pentoxide and 56% silica; (c) 25% mangani-9-molybdic acid, 5% arsenic pentoxide and 70% silica; (d) 45% mangani-9-molybdic acid, 5% arsenic pentoxide and 50% silica; (e) 50% mangani-9-molybdic acid, 5% arsenic pentoxide and 45% silica; (f) 15% mangani-9-molybdic acid, 5% arsenic pentoxide and 80% silica; (g) 50% mangani-9-molybdic acid, 10% arsenic pentoxide and 40% silica and (h) 38% mangani-9-molybdic acid, 2% arsenic pentoxide, and 60% silica, for example, can be prepared and used in the process of our invention.

The invention has been described in detail with particular reference to preferred embodiments thereof, but it will be understood that variations and modifications can be effected within the spirit and scope of the invention as described hereinbefore and as defined in the appended claims.

We claim:

1. A process for preparing acrolein and acrylic acid or methacrolein and methacrylic acid which comprises reacting in the vapor phase propylene or isobutylene, respectively, with oxygen at a temperature of from about 300° C. to about 600° C. in the presence of a catalyst comprising a calcined mixture of (1) about 1 to about 20% by weight of an oxide of arsenic, calculated as $As_2O_5$, (2) about 5 to about 60% by weight of a heteropoly acid of molybdenum containing manganese as the central atom and (3) about 30 to about 94% by weight carrier, wherein (1) and (2) are supported on said carrier and wherein said heteropoly acid is present in greater percent by weight than the oxide of arsenic.

2. The process of claim 1 wherein the proportion of olefin to oxygen is in the mole ratio of from 1:0.2 to 1:10.

3. The process of claim 2 wherein the contact time is from 0.5 to 10 seconds.

4. The process of claim 3 wherein the reaction is carried out in the presence of an inert gaseous diluent.

5. The process of claim 3 wherein the oxygen is in the form of air.

6. The process of claim 3 wherein the carrier is silica.

7. The process of claim 3 wherein the oxide of arsenic is arsenic pentoxide.

8. The process of claim 1 wherein the heteropoly acid is mangani-9-molybdic acid.

9. A process for preparing acrolein and acrylic acid which comprises reacting propylene with oxygen in the vapor phase at a temperature of from about 300° C. to about 600° C. in the presence of a catalyst comprising a calcined mixture of (1) about 1 to about 20% by weight of an oxide of arsenic, calculated as $As_2O_5$, (2) about 5 to about 60% by weight of a heteropoly acid of molybdenum containing manganese as the central atom and (3) about 30 to about 94% by weight carrier, wherein (1) and (2) are supported on said carrier and wherein said heteropoly acid is present in greater percent by weight than the oxide of arsenic.

10. The process of claim 9 wherein the proportion of propylene to oxygen is in the mole ratio of from 1:0.2 to 1:10.

11. The process of claim 10 wherein the contact time is from 0.5 to 10 seconds.

12. The process of claim 10 wherein the reaction is carried out in the presence of an inert gaseous diluent.

13. The process of claim 10 wherein the oxygen is in the form of air.

14. The process of claim 9 wherein the carrier is silica.

15. The process of claim 10 wherein the oxide of arsenic is arsenic pentoxide.

16. The process of claim 10 wherein the heteropoly acid is mangani-9-molybdic acid.

References Cited

UNITED STATES PATENTS 3,177,257    4/1965    Detling et al. _____ 260—604

FOREIGN PATENTS 605,502    6/1961    Belgium.

LEON ZITVER, *Primary Examiner.*

R. H. LILES, *Assistant Examiner.*